United States Patent [19]

Smith

[11] Patent Number: 6,032,325
[45] Date of Patent: Mar. 7, 2000

[54] PORTABLE DRIVE UNIT FOR ROTATIONAL CLEANING TOOLS

[76] Inventor: David A. Smith, 14775 Lochinvar Dr., Dallas, Tex. 75240

[21] Appl. No.: 09/139,363

[22] Filed: Aug. 25, 1998

Related U.S. Application Data

[60] Provisional application No. 60/056,268, Aug. 29, 1997.

[51] Int. Cl.[7] .................................. A47L 7/02; A47L 9/22
[52] U.S. Cl. ................................... 15/304; 15/339; 15/383; 15/395
[58] Field of Search .............................. 15/304, 339, 383, 15/395

[56] References Cited

U.S. PATENT DOCUMENTS

| | | | |
|---|---|---|---|
| 4,792,363 | 12/1988 | Franklin, Jr. et al. | 15/383 |
| 5,107,568 | 4/1992 | Wade | 15/395 |
| 5,347,677 | 9/1994 | Prentice | 15/395 |
| 5,584,093 | 12/1996 | Melendres | 15/395 |
| 5,813,089 | 9/1998 | Nolan et al. | 15/383 |

*Primary Examiner*—Robert J. Warden, Sr.
*Assistant Examiner*—Theresa T. Snider

[57] ABSTRACT

This invention is a portable device for cleaning air ducts, other parts of ventilation systems, and similar spaces. The device prevents motor burn-out by providing an adjustable slipping means in the transmission connecting the motor's shaft to a cleaning tool.

1 Claim, 5 Drawing Sheets

PORTABLE DRIVE UNIT FOR ROTATIONAL CLEANING TOOLS

This application claims benefit of Provisional Appl. 60/056,268 filed Aug. 29, 1997.

FIELD OF THE INVENTION

This invention relates to vent and duct cleaning systems and specifically to a portable drive device for a vent cleaning system for removing dust from the air conditioning and heating vents and ducts of residential and commercial buildings.

BACKGROUND OF THE INVENTION

Airborne particulates pose an increasing health problem within commercial and residential buildings. Numerous devices and systems have been devised to reduce the airborne particulates by cleaning, or removing dust and particulates from vents within homes and commercial buildings. An example of a vent cleaning system can be seen in U.S. Pat. No. 4,792,363 (the '363 patent) granted to Franklin, Jr. et al. on Dec. 20, 1988. The vent cleaning system disclosed in the '363 patent includes a housing that encloses a drive motor, a vacuum motor, a vacuum filter and a vacuum bag. The drive motor and the vacuum motor are connected to a hose, which has a flexible shaft throughout its length. One end of the flexible shaft connects to the drive motor and its other end connects to a brush. The drive motor turns the flexible shaft and this in turn rotates the brush.

The inconvenience with prior vent cleaning systems and devices is that they are cumbersome to transport. Furthermore, many of the previously developed cleaning systems lack a necessary means of adjusting a "slip threshold" for a drive motor. In other words, motors often "burn-out" when a rotating tool, driven by the motor, encounters an object which prevents the tool from continued rotation.

Accordingly, a need has arisen in the art for a compact, portable drive device and a drive device having adjustable friction device for use with commercial and residential property ventilation cleaning systems.

SUMMARY OF THE INVENTION

The present invention is a portable vent cleaning device for use in connection with air ducts and ventilation systems of a building.

It is an object of the present invention to overcome the inadequacies of prior drive devices used in connection with tools for cleaning air vents and ducts.

It is a further object of the present invention to provide a portable vent cleaning device that is compact allowing for easy use and transportation of the device by a user.

Yet another object of the present invention is to provide a adjustment device for a drive motor that will allow for varying slip thresholds.

Still a further object of the present invention is to provide a portable vent cleaning device, which is relatively inexpensive to manufacture.

In a preferred embodiment, the present device generally comprises a base, a motor rotatably mounted to the base, a transmission connected to the motor and being adapted for receiving a flexible tool shaft, and a support member mounted to the base. The support member supports a friction adjustment device and a plumbing tee. The friction adjustment device adjusts the rotation of the motor relative to the base. The plumbing tee is allows connection with a hose for a cleaning tool and with a conduit or hose that is also connected to an external air extractor.

The above, as well as additional objects, features and advantages of the present invention will become apparent in the following detailed description.

DETAILED DESCRIPTION OF THE INVENTION

FIGURES 1–3

Figure 1:
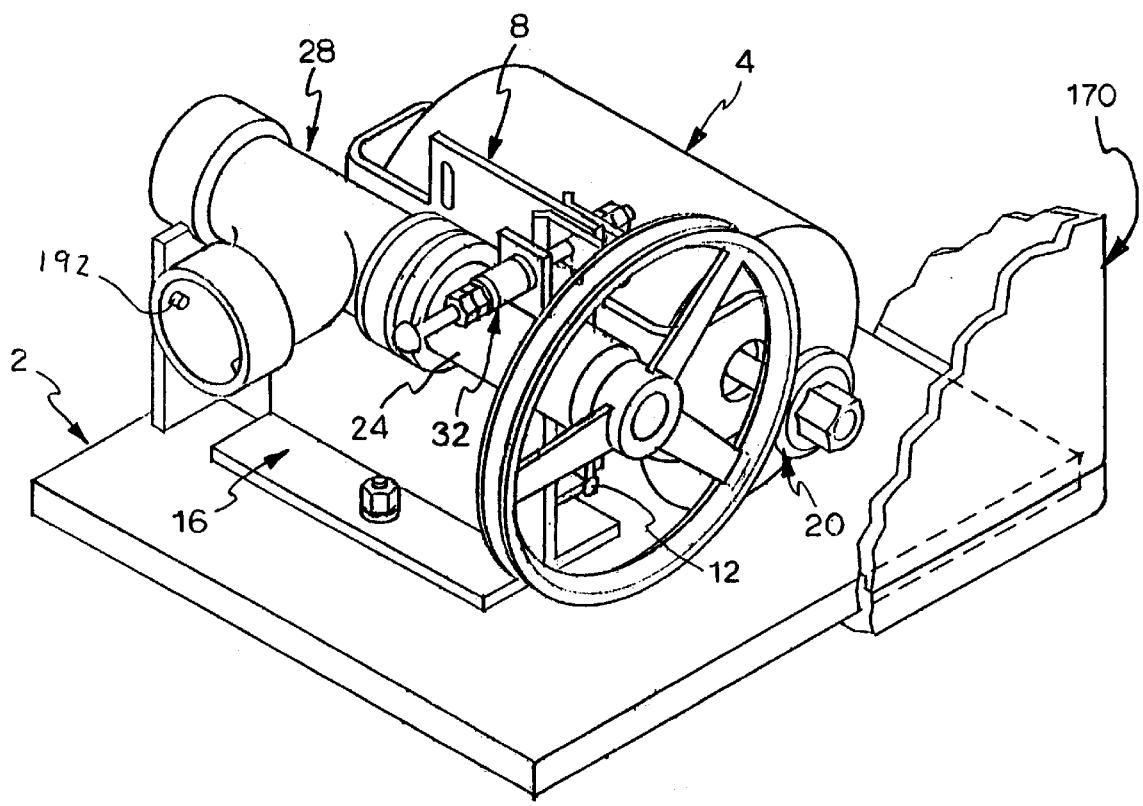
FIG. 1 is a perspective view of the apparatus according to the present invention.
Figure 6:
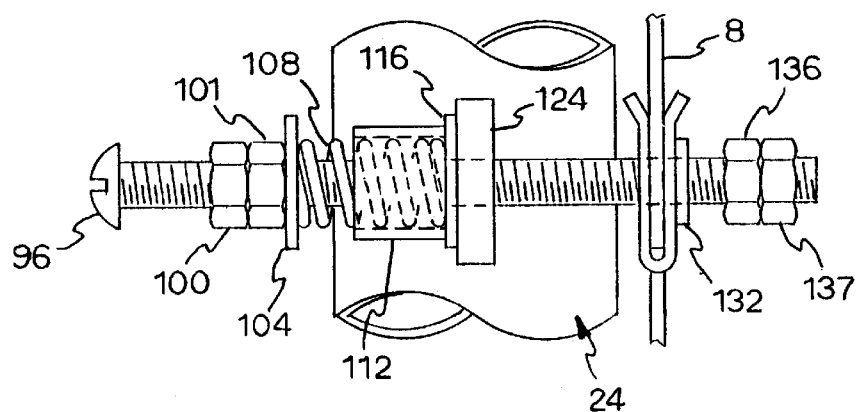
FIG. 6 is a top view of the friction adjustment device.
Figure 2:
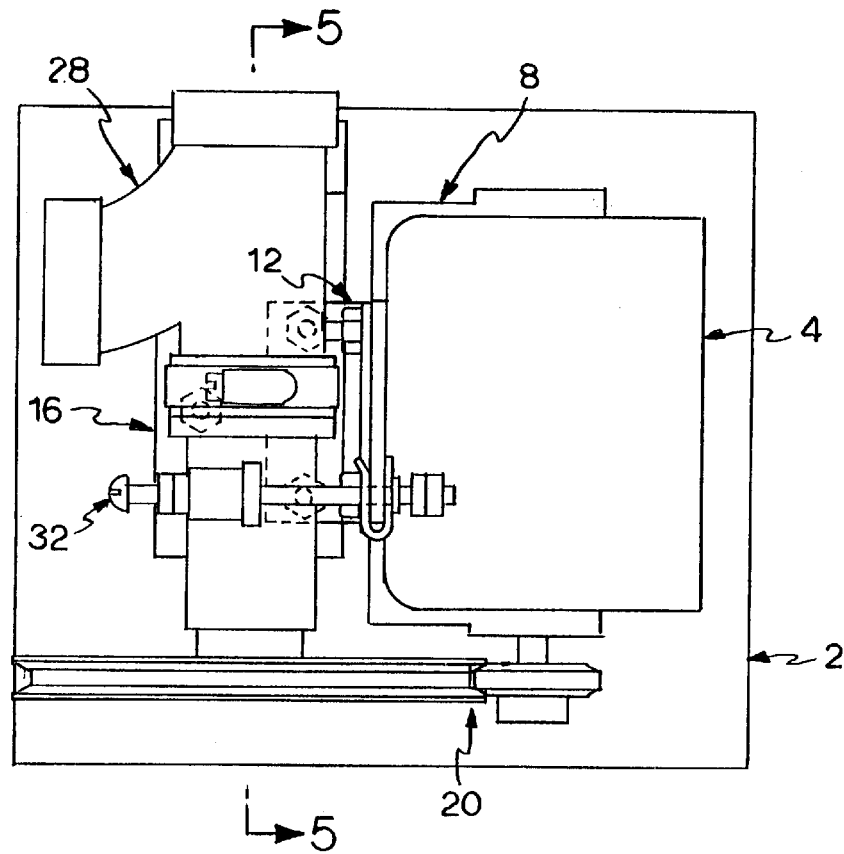
FIG. 2 is a top view of the apparatus.

The apparatus made in accordance with the present invention is shown having a base 2. The apparatus also includes a motor 4 mounted to a motor mounting bracket 8. The motor mounting bracket 8 is attached to a hinge 12. Hinge 12 is attached to a support member 16. Support member 16 is mounted to base 2. Encasing the apparatus is a shell 170.

Hinge 12 may be of any conventional door-type hinge. Hinge 12 is arranged to allow the rotational movement of motor 4 relative to support member 16 and base 2, as will be discussed further below.

The present apparatus also includes a transmission 20, which will be described further below. Mounted to support member 16 is a housing 24 and a plumbing tee 28. A friction adjustment device 32 extends through and adjustably connects housing 24 to motor mounting bracket 8. Friction adjustment device 32 and its components will be discussed further below.

FIGURES 4–6

Transmission 20 includes a drive pinion 36 and a driven wheel or pulley 40. Drive pinion 36 is attached to a drive shaft 38. Drive shaft 38 is rotated by motor 4. Motor 4 can be any type of motor so long as it provides a rotational force to a drive shaft. Further, the motor 4 may be an A-C electric motor.

Drive pinion 36 is made of a material to provide friction between it and the driven wheel 40. In other words, when the drive pinion 36 rotates, it will transmit the rotation to the driven wheel 40 and cause it to rotate.

The present invention will allow the drive pinion 36 to "slip" when the driven wheel 40 is not able to rotate for reasons that will be discussed further below. Slip means that the drive pinion 36 will continue to rotate but the driven wheel 40 will not. Slip will occur at a force which is relative to the positioning relationship of the drive pinion 36 and the driven wheel 40. The tighter that wheel 40 and drive pinion 36 are held in contact with one another, the more force that will be required to prevent wheel 40 for rotating.

Slipping of drive pinion 36 will prevent motor 4 from "burning-out." Motor 4 would be damaged if the drive pinion 36 was not allowed to slip and the motor 4 continued to try to turn pinion 36.

The material for drive pinion 36 is similar to a material commonly used for modern automobile brake pads. Drive pinion 36 may be worn down after excessive wear or extended use.

It is contemplated that a belt may be employed around drive pinion 36 and driven pulley 40, rather than a frictional drive arrangement.

Nut 44 is arranged to maintain drive pinion 36 on drive shaft 38. It is understood that nut 44 may be removed to allow for the removal of a particular drive pinion 36. Accordingly, other drive pinions, not shown, of varying materials, designs or diameters, may be placed on drive shaft 38.

Driven wheel 40 is supported by support member 16 and housing 24. Particularly, driven pulley 40 is mounted on a driven shaft 48 and held in place on shaft 48 with a screw 52. Shaft 48 is allowed to rotate within housing 24 owing to bearings 56, which are disposed within housing 24.

Housing 24 is hollow and has an internal periphery 60. The diameter of the internal periphery is not constant and has a stepped portion 64. Stepped portion 64 of the internal periphery is the area within the housing 24 where bearings 56 are disposed.

Snap rings or clips 68 and 72 retain the bearings 56 and shaft 48 in the housing 24. Particularly, snap ring 68 fits or mates with an internal annular recess 70 within stepped portion 64 of the internal periphery 60. Snap ring 72 likewise fits or mates with a annular recess 74 on shaft 48.

Attached to or formed as a part of support 16 is an end support member 76. End support 76 may be welded to support member 16. Support member 16 includes a slot 80.

End support member 76 and slot 80 aid in supporting tee 28. Particularly, a strap 84 is used to hold tee 28 to housing 24. Strap 84 is threaded through slot 80. Screw 88 is used to tighten strap 84.

Formed as a part of end support member 76 is a saddle 92. Saddle 92 is adapted for mating with and support tool connecting end 182 of tee 28.

Friction adjustment device 32 is comprised of numerous parts. Particularly, a threaded shaft 96 extends through two nuts 100 and 101, then through a washer 104. A spring 108 is then placed about shaft 96 with a spring casing 112 about a portion of spring 108. Washer 116 abuts spring casing 112. Shaft 96 is then disposed through non-threaded aperture 120 in a flange 124 that is mounted on housing 24. Shaft 96 then extends through a slot 128 in motor mounting bracket 8. Slidably attached to motor mounting bracket 8 and substantially adjacent slot 128 is an anchor nut 132. Shaft 96 is threaded through anchor nut 132 and then to nuts 136 and 137.

Figure 7:
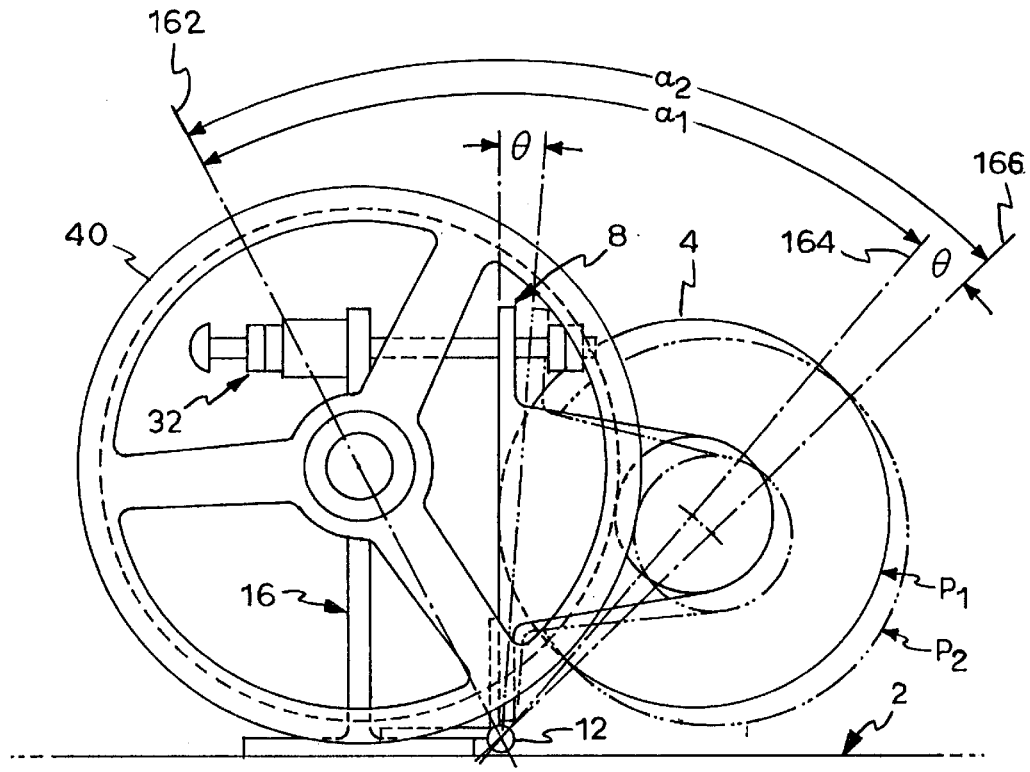
FIG. 7 is a side elevational view showing angular displacement of the motor, with a second position shown in phantom lines; and, FIG. 8 is a schematic diagram illustrating the apparatus according to the present invention when interconnected with an external extractor and a tool.

Friction adjustment device 32 in this arrangement will apply adjustable tension between drive pinion 36 and driven wheel or pulley 40. Friction adjustment device 32 accomplishes this by allowing motor mounting bracket 8 which is attached to hinge 12 to rotate in relation to support member 16 so that drive pinion 36 either moves toward or away from driven wheel 40. Note, this angular displacement and relationship is shown in FIG. 7. The adjustment device 32, with spring 108 in the positional relationship shown, acts like a dampener to absorb vibration that is transferred to the motor from drive wheel 40. Drive wheel 40 receives vibration from a tool such as a brush, not shown, when in use.

Friction adjustment device 32 may be adapted to be automatic or electrically driven or the like, rather than by the arrangement shown.

Figure 3:
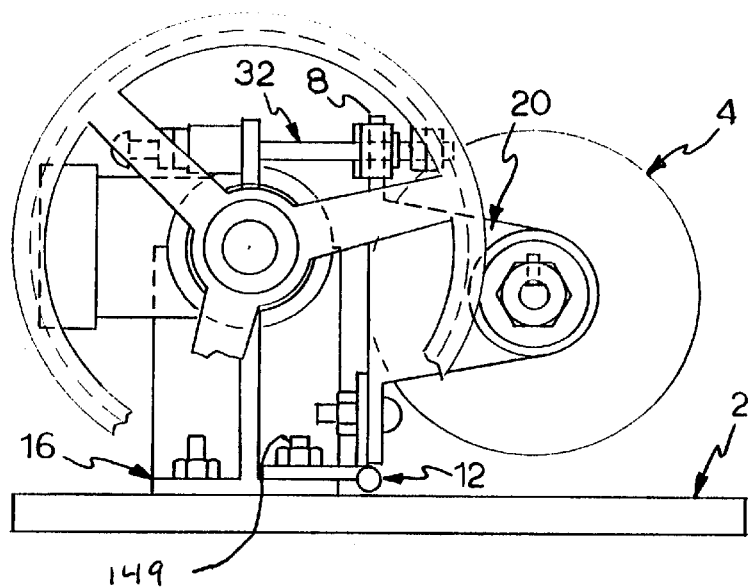
FIG. 3 is a side elevational view of the apparatus.

To understand the mounting or attachment arrangements between the remaining various parts, the following alignments with the various slots and apertures are discussed. A slot 140 in mounting bracket 8 is aligned with an aperture 142 in hinge 12. Likewise, a slot 144 in mounting bracket 8 is aligned with an aperture 146 in hinge 12. Aperture 148 in hinge 12 is to be aligned with an aperture 150 in support member 16. Note, the bolt or screw which goes through apertures 148 and 150 are also attached to base 2, (shown in FIG. 3 as number 149). Aperture 152 in hinge 12 is to align with an aperture in support member 16, not shown similar to apertures 148 and 150. Support member 16 includes another aperture 154 which is used for mounting support member to base 2.

The reason drive pinion 36 transfers rotation to driven wheel 40 and subsequently to shaft 48 is to rotate a flexible tool shaft, not shown. U.S. Pat. No. 4,792,363, issued Dec. 20, 1988, is herein incorporated by reference.

Shaft 48 is adapted to have a bore 156, which may or may not extend throughout shaft 48, in order to allow a tool attachment piece, not shown, to engage shaft 48. To effect engagement of the tool attachment device to shaft 48, a pin 158 is positioned through an aperture 160 in shaft 48. Aperture 160 does not extend through the center line of shaft 48.

FIGURE 7

FIG. 7 illustrates how with an adjustment to friction adjustment device 32, namely, either tightening or loosening thereof, can change the positioning of motor 4. For example, if adjustment device 32 is loosened, motor 4 will rotate from position P1 to P2. The angular displacement between those two position is represented as angle θ. When the motor 4 is in position P1 there is an angle 1 α1 between a reference line 162 and a reference line 164. Reference line 162 extends from the hinge 12 through driven wheel 40. A reference line 164 and reference line 166 extend from hinge 12 through the center of motor 4. When the motor 4 is rotated to position P2, the angular displacement increases to α2. Note, FIG. 7 does not show the extremes positions or the limits of the rotational movement of the elements of this apparatus.

FIGURE 8

Figure 8:
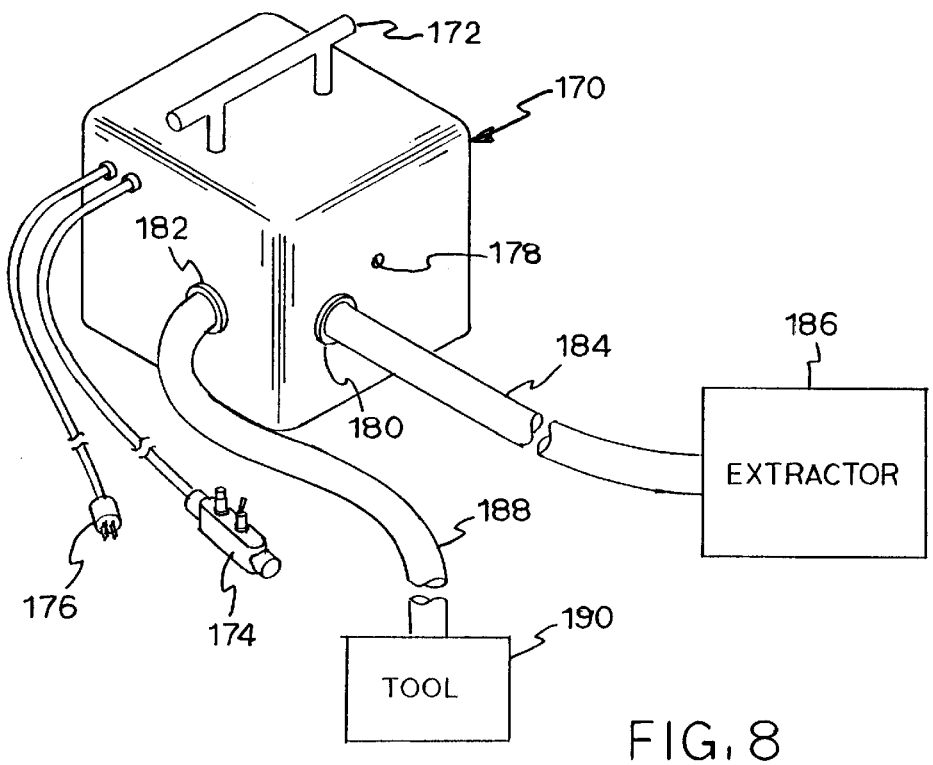

In FIG. 8, the apparatus shown encased or enclosed within a covering or shell 170. Shell 170 also includes a handle 172 for easy carrying of the apparatus. Handle 172 enables the apparatus to be portable. Shell 170 can be made from numerous materials such as plastic.

Extending out from shell 170 is a control line with controls 174. Electrical controls 174 attach to motor 4 inside shell 170. Controls 174 allows the user to initiate, terminate and control the rotational direction of motor 4.

Also extending out from shell 170 is a plug 176, which provides electrical power to motor 4.

Aperture 178 in shell 170 is for allowing the user to adjust the friction adjustment device 32.

Figure 4:
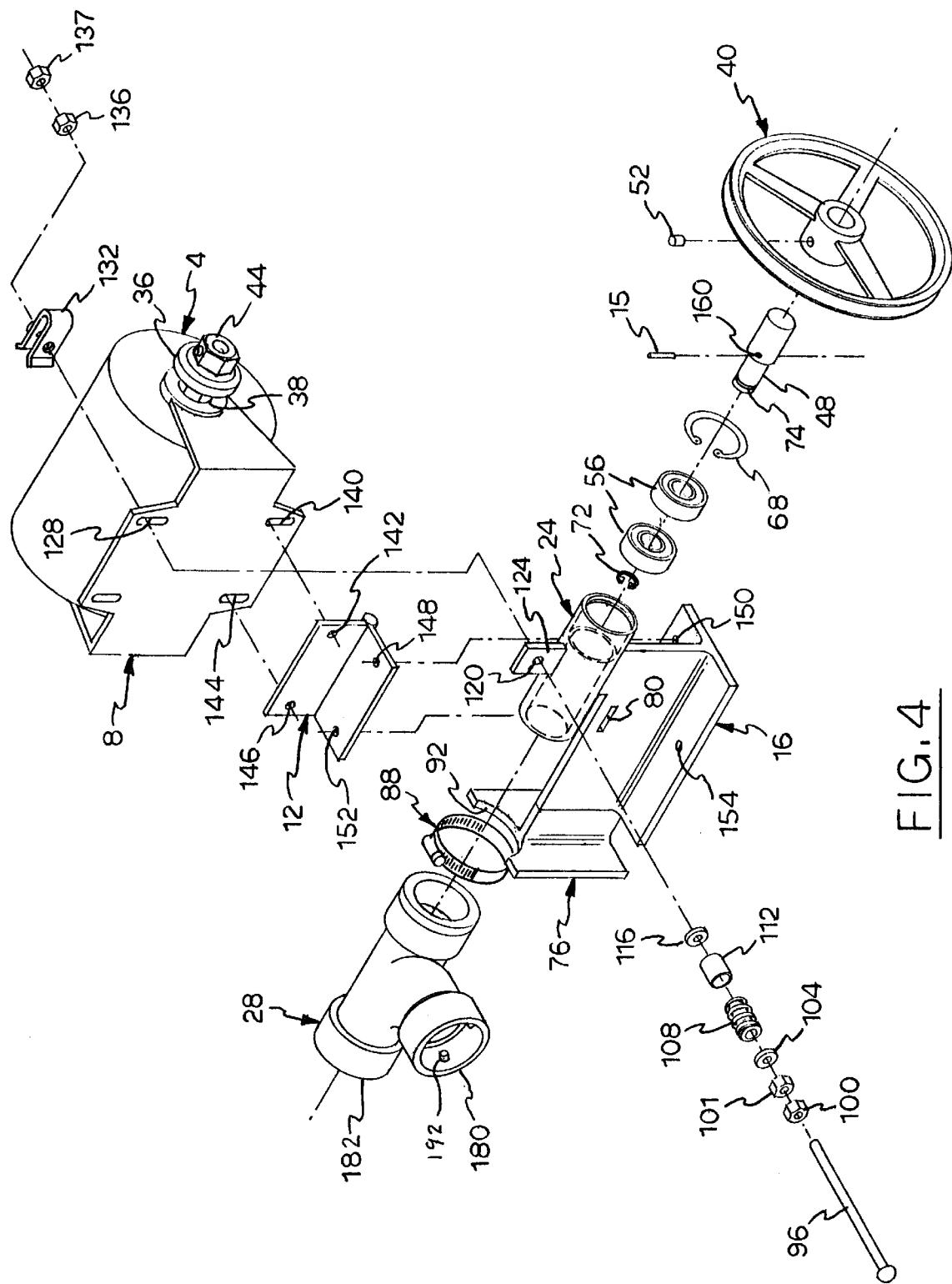
FIG. 4 is an exploded view of some of the components of the present apparatus.

Tee 28, includes a vacuum connection end 180 and a tool connection end 182 (also shown in FIG. 4, as well as in FIG. 8).

Connecting to vacuum connection end 180 is a flexible hose 184 that leads to an extractor 186. The extractor 186 may be a portable unit of type used by, for example, professional carpet cleaners or ventilation cleaners or it may even be a unit built-in to a building, such as a central vacuum system.

Figure 5:
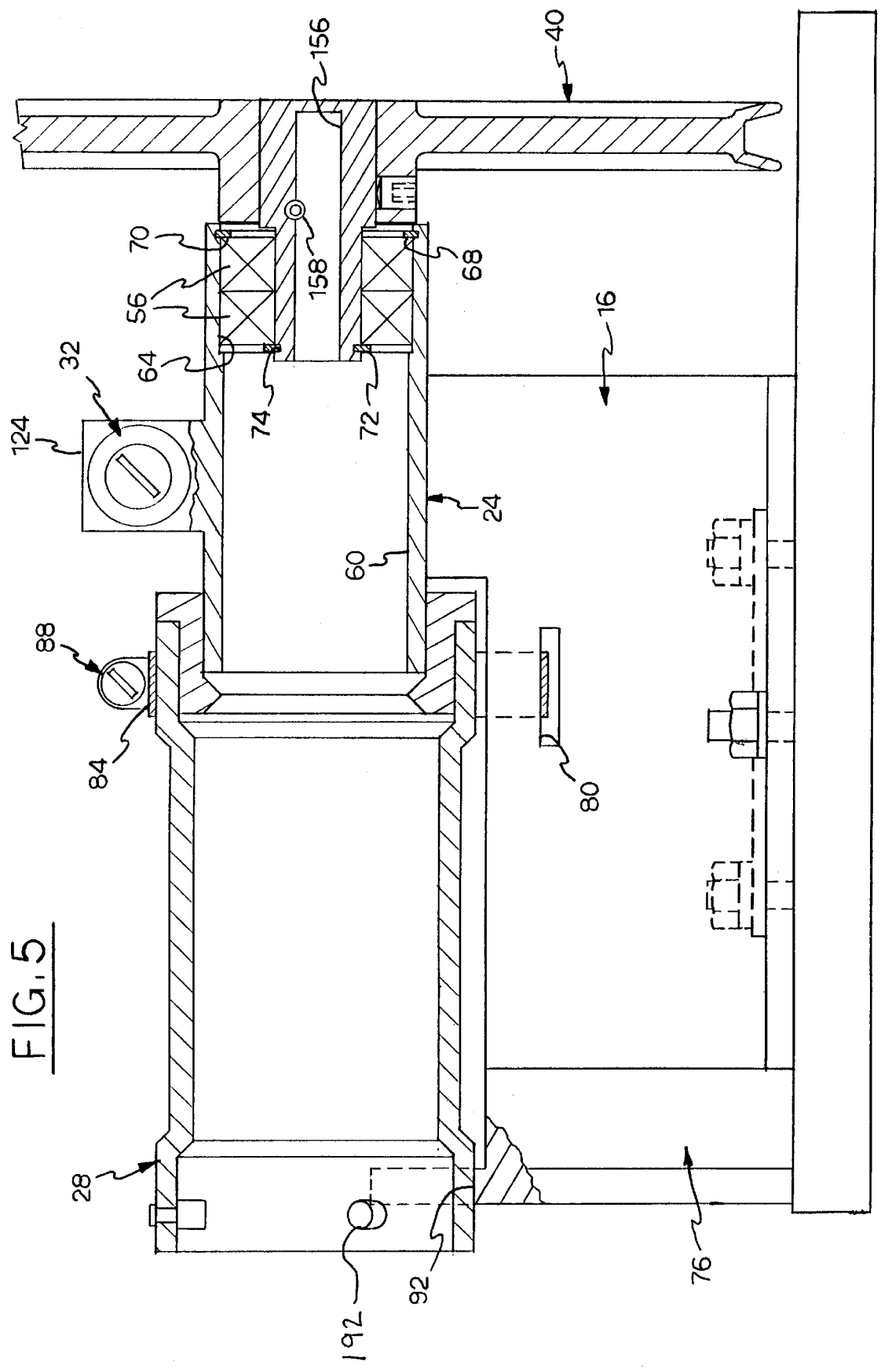
FIG. 5 is a side cross-sectional view taken along line 5—in FIG. 2.

Connecting to tool connection end 182, is a flexible conduit or hose 188 that leads to a tool 190, such as a rotating brush. Nubs or nipples 192 (shown in FIGS. 1, 4 and 5) are disposed on the inner periphery of ends 180 and 182. Hoses 184 and 188 have recesses, not shown, for mating with nubs 192 to prevent hoses 184 and 188 from disconnecting.

Extractor 180 produces a vacuum or negative pressure within conduit 184. The vacuum then is maintained within tee 28, and subsequently through conduit 188, resulting in a vacuum or negative pressure at the users tool 190.

Extending through tee 28 and hose 188, is a flexible, rotational tool shaft, not shown. The tool shaft connects to driven wheel shaft 48, as disclosed above. The tool shaft runs throughout conduit 188 to connect to tool 190. Tool 190 will be of the type that rotates in order to perform its tasks. For further disclosure regarding this type of arrangement, U.S. Pat. No. 4,792,363, issued Dec. 20, 1988, is herein incorporated by reference.

The present invention has several distinct advantages over the prior art systems. First, the present device can be readily adapted to portable applications. Additionally, the device can even be used with built-in extractors, without extensive retrofitting. Further, the friction adjustment device 32, allows a user to have complete control of the tension or friction of slip threshold between drive pinion 36 and driven wheel 40. A user can simply tighten or loosen the friction adjustment device to the desired setting depending on the application since different obstacles and conditions will be encountered with different applications. When the drive pinion 36 is tightened, or brought closer to driven wheel 40, the more force that is obstructing or preventing a tool from rotating and subsequently wheel 40 will be required to make drive pinion 36 slip on driven wheel 40.

As adjustment device 32 is adjusted, shaft 96 may move along the length of and within slot 128. Anchor nut 132 will also slightly move along the length of slot 128, when adjustment device 32 is tightened or loosened.

All these features taken together provide a self-contained portable unit which greatly increases the efficiency of existing indoor and outdoor vent cleaning systems and apparatuses.

While this invention has been described as having a preferred design, it is understood that it is capable of further modification, uses and/or adaptions following in general the principal of the invention and including such departures from the present disclosure as come within known or customary practice in the art to which the invention pertains, and as may be applied to the essential features set forth, and fall within the scope of the invention or the limits of the appended claims.

I Claim:

1. A portable drive unit for rotational cleaning tools, comprising:

a) a base;

b) a support member mounted to said base;

c) a hinge attached to said support member;

d) a motor attached to said hinge allowing said motor to rotate relative to said base, said motor having a drive shaft;

e) a transmission having a drive pinion being connected to said drive shaft and a driven wheel rotatably engaging said drive pinion;

f) a driven shaft having said driven wheel mounted thereon and being adapted for receiving a flexible shaft of the cleaning tool;

g) a housing being supported by said support member, said housing adapted to rotatably support said driven shaft;

h) a conduit tee being connected to said housing and having a tool connection end for connection with a tool conduit and a vacuum connection end for connection with an extractor conduit providing a negative pressure through said tool conduit; and, i) a friction adjustment device being disposed between said housing and said motor, said friction adjustment device allowing finite adjustment of positioning of said motor relative to said support member and thereby adjusting said engagement of said drive pinion and said driven wheel.

* * * * *